(12) United States Patent
Murakami

(10) Patent No.: US 11,713,826 B2
(45) Date of Patent: Aug. 1, 2023

(54) CONTROL VALVE

(71) Applicant: HITACHI ASTEMO, LTD., Hitachinaka (JP)

(72) Inventor: Shingo Murakami, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/641,070

(22) PCT Filed: Sep. 3, 2020

(86) PCT No.: PCT/JP2020/033452
§ 371 (c)(1),
(2) Date: Mar. 7, 2022

(87) PCT Pub. No.: WO2021/054139
PCT Pub. Date: Mar. 25, 2021

(65) Prior Publication Data
US 2022/0341503 A1  Oct. 27, 2022

(30) Foreign Application Priority Data
Sep. 18, 2019 (JP) .................................. 2019-169665

(51) Int. Cl.
*F16K 27/06* (2006.01)
*F16K 11/085* (2006.01)

(52) U.S. Cl.
CPC ........ *F16K 27/065* (2013.01); *F16K 11/0856* (2013.01)

(58) Field of Classification Search
CPC ........................... F16K 11/0856; F16K 27/065
See application file for complete search history.

(56) References Cited

U.S. PATENT DOCUMENTS 10,808,856 B2    10/2020  Shen et al.
2016/0281585 A1*  9/2016  Muizelaar ............. F16K 11/165
2019/0211944 A1*  7/2019  Ismert ..................... F16K 1/301

FOREIGN PATENT DOCUMENTS

JP       2018-184937 A    11/2018

OTHER PUBLICATIONS

International Search Report dated Nov. 24, 2020 issued in International Application No. PCT/JP2020/033452, with English translation, 5 pages.

(Continued)

*Primary Examiner* — Kevin R Barss
(74) *Attorney, Agent, or Firm* — Foley & Lardner LLP

(57) ABSTRACT

A control valve includes: a second inner circumferential portion capable of holding a first spring, in a first communication passage provided at a first discharge opening of a housing; and a recessed portion recessed in a radial direction, at a position that is a part of a region in a circumferential direction of the second circumferential portion and overlaps a second communication passage opening in a biasing direction of the first spring. Therefore, when inserting the first spring into the first communication passage, it is possible to hold the first spring with the inner circumferential surface of the second inner circumferential portion. Consequently, the first spring is appropriately mounted in the second circumferential portion, thereby preventing a mounting defect of the first spring.

10 Claims, 13 Drawing Sheets

(56) References Cited

OTHER PUBLICATIONS

Notification Concerning Transmittal of International Preliminary Report on Patentability dated Mar. 31, 2022, issued in International Application No. PCT/JP2020/033452, with English translation, 10 pages.

* cited by examiner

CONTROL VALVE

TECHNICAL FIELD

The present invention relates to a control valve.

BACKGROUND ART

Patent Document 1 described below discloses an example of a conventional control valve.

In outline, the control valve includes a first communication passage being open in a radial direction of a housing and containing: a seal member establishing sealing between the first communication passage and a valve body; a bias member having a cylindrical shape and biasing the seal member toward the valve body; and a cap having a shape of a bottomed cylinder and supporting the bias member. The first communication passage has a first inner peripheral section retaining the seal member and a second inner peripheral section retaining the cap. The second inner peripheral section is expanded in diameter in comparison with the first inner peripheral section, so as to form a step therebetween. The bias member is contained in an inner circumferential part of the cap retained by the second inner peripheral section.

PRIOR ART DOCUMENT(S)

Patent Document(s)

Patent Document 1: JP 2018-184937 A

SUMMARY OF THE INVENTION

Problem(s) to be Solved by the Invention

The conventional control valve described above is, however, configured such that the bias member is contained in the inner circumferential part of the cap so as to overlap with the cap in a radial direction of the bias member and the cap. Accordingly, the bias member and an inner peripheral surface of the second inner peripheral section have a gap therebetween for insertion of the cap, and the bias member before inserting the cap is movable in its radial direction of the bias member, within an extent of the gap. This allows the bias member to move in its radial direction upon inserting the seal member and the bias member and the cap in this order into the first communication passage via an outer opening of the first communication passage, and thereby may cause failure in installation of the bias member in which the bias member is incorrectly sandwiched between the seal member and the cap.

In view of the foregoing technical problem, it is desirable to provide a control valve configured to suppress failure in installation of a bias member.

Means for Solving the Problem(s)

According to one aspect of the present invention, a first communication passage includes a second inner peripheral section structured to retain a bias member, and includes a depression depressed in a radial direction, wherein the depression is formed to occupy a circumferentially partial region in the second inner peripheral section and overlap with an opening in position in a bias direction of the bias member.

Effect(s) of the Invention

The present invention serves to suppress failure in installation of a bias member.

BRIEF DESCRIPTION OF THE DRAWINGS

FIG. 12A is a perspective view. FIG. 12B is a front view. FIG. 12C is a sectional view along a line F-F in FIG. 12B.

FIG. 13A shows a state in which the first seal member has been inserted into a second inner peripheral section. FIG. 13B shows a state immediately before the seal member is inserted into a first inner peripheral section. FIG. 13C shows a state in which the first seal member has been inserted into the first inner peripheral section.

MODE(S) FOR CARRYING OUT THE INVENTION

The following describes an embodiment of a control valve according to the present invention, with reference to the drawings. The embodiment below shows an example in which the control valve according to the present invention is employed in a circulation system for vehicle cooling water (simply referred to as cooling water in the following) similarly to the conventional one.

Figure 1:
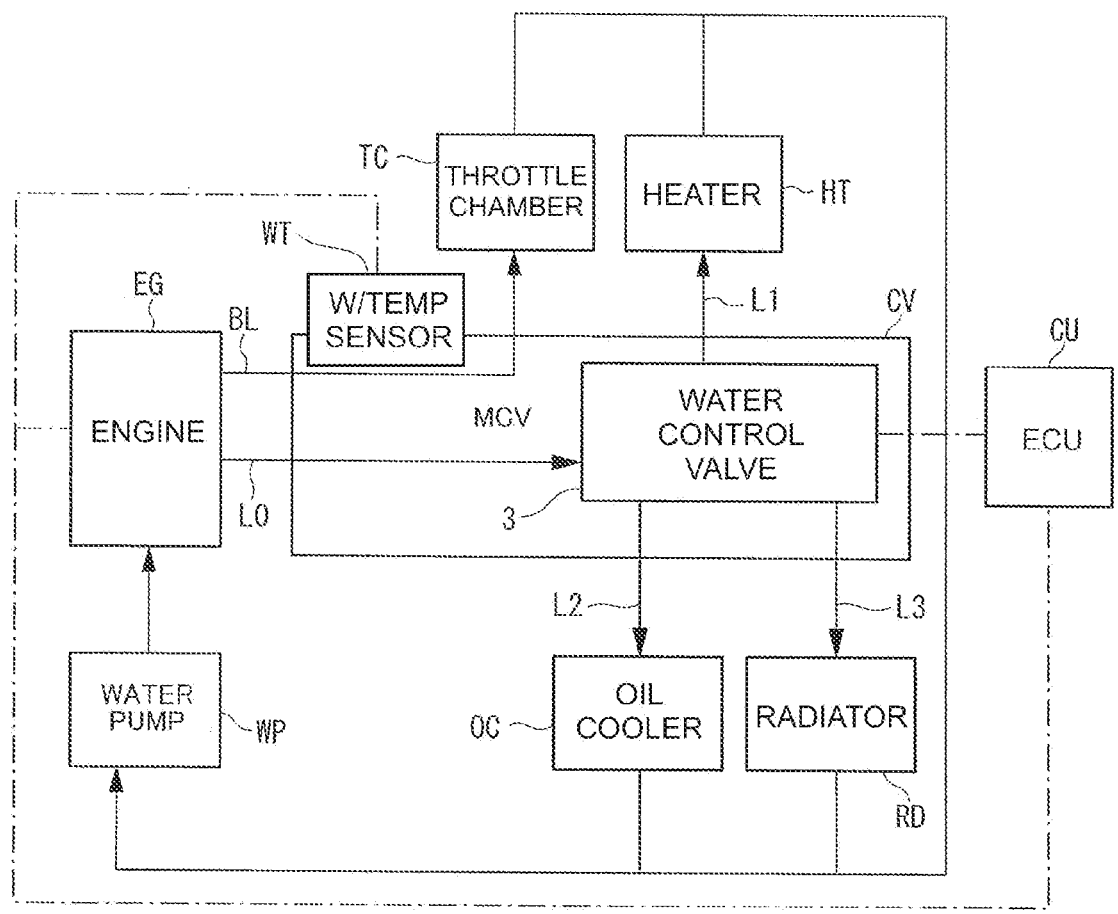
FIG. 1 is a block diagram showing configurations of a circulation circuit for vehicle cooling water that employs a control valve according to the present invention.

(Configurations of Cooling Water Circulation Circuit) FIG. 1 is a block diagram showing configurations of a cooling water circulation circuit serving as a cooling circuit for a prime mover of a vehicle and employing the control valve according to the present invention.

The control valve CV is disposed beside engine EG: specifically, beside a cylinder head not shown. As shown in FIG. 1, control valve CV is surrounded by a heater HT, an oil cooler OC, and a radiator RD. Heater HT is a heat exchanger for heating, and produces warm wind of an air conditioner not shown. Oil cooler OC cools oil for lubrication among sliding contact parts inside the engine EG. Radiator RD cools the cooling water for cooling of engine EG.

Reference sign WP in the drawing represents a water pump for circulation of the cooling water. Reference sign WT represents a water temperature sensor for drive control of control valve CV. Control valve CV is driven with control electric current from an electronic control unit CU, depending on measurement results of water temperature sensor WT.

Reference sign TC represents a throttle chamber controlling a flow rate of air to be mixed with fuel for combustion inside the engine EG.

Specifically, the cooling water discharged from water pump WP is introduced to control valve CV via an inlet passage L0. Control valve CV includes a valve 3 driven under control of electronic control unit CU depending on operational conditions of engine EG such as the measurement results of water temperature sensor WT. Due to the driving of valve 3, the cooling water introduced to control valve CV via inlet passage L0 is distributed to heater HT, oil cooler OC, and radiator RD, respectively via a first pipe L1, a second pipe L2, and a third pipe L3.

Control valve CV further includes a bypass passage BL for directly introducing the cooling water from engine EG to throttle chamber TC by bypassing the inlet passage L0. Bypass passage BL continuously supplies the cooling water, which is introduced to control valve CV via inlet passage L0, to throttle chamber TC.

Thus, control valve CV serves as a 1in-3out type distribution device, and distributes the cooling water, which is introduced to control valve CV via inlet passage L0, to the first, second, and third pipes L1 to L3, while controlling flow rates of the cooling water upon the distribution.

The present embodiment shows engine EG, i.e. an internal combustion engine, as an example of a prime mover for a vehicle. However, the prime mover is not limited to engine EG, but may be any device structured to convert energy to motive power, such as a motor or a fuel cell.

Figure 2:
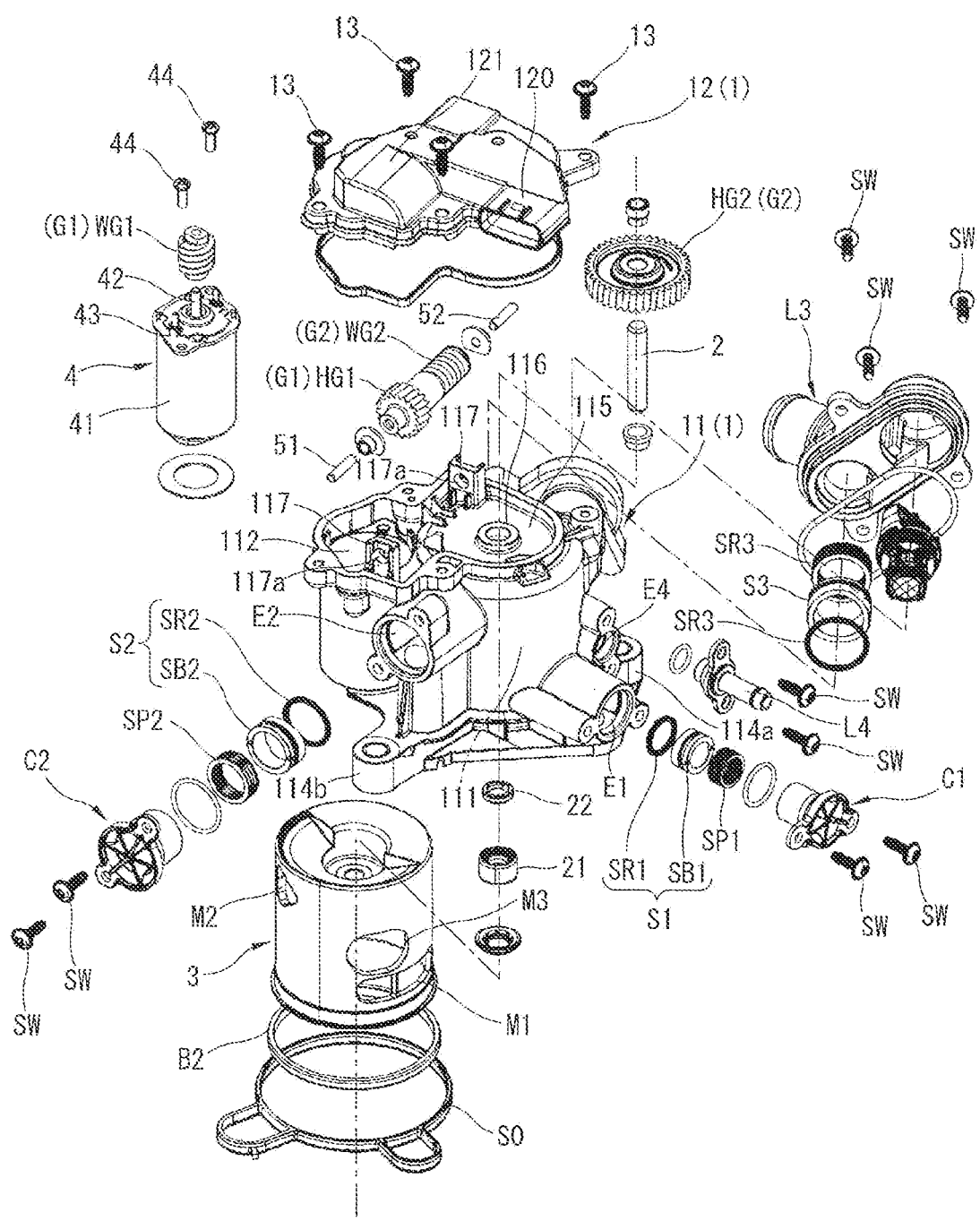
FIG. 2 is an exploded perspective view of a control valve according to a first embodiment of the present invention.
Figure 3:
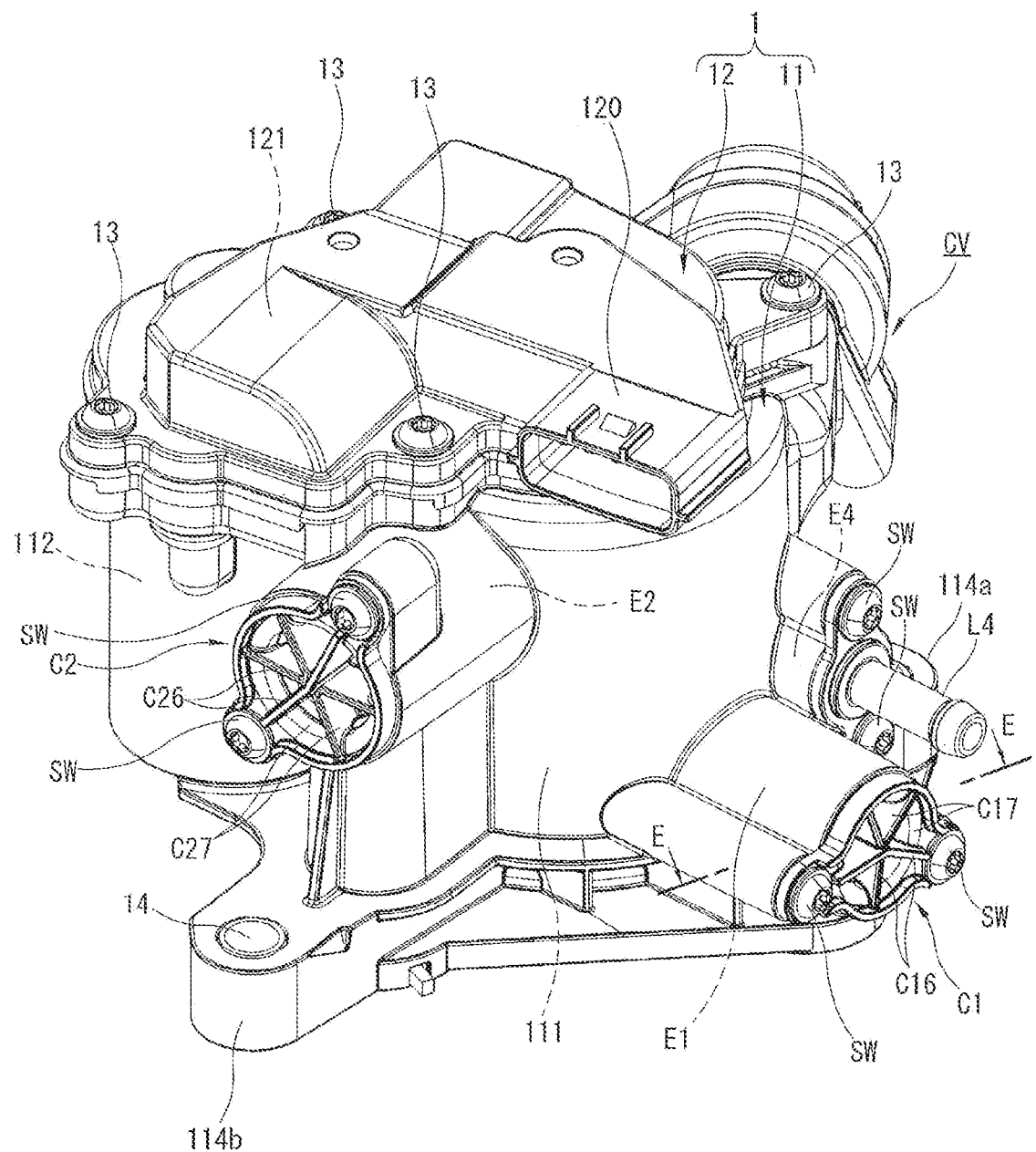
FIG. 3 is a perspective view of the control valve according to the present invention when viewed from a second-housing side.
Figure 4:
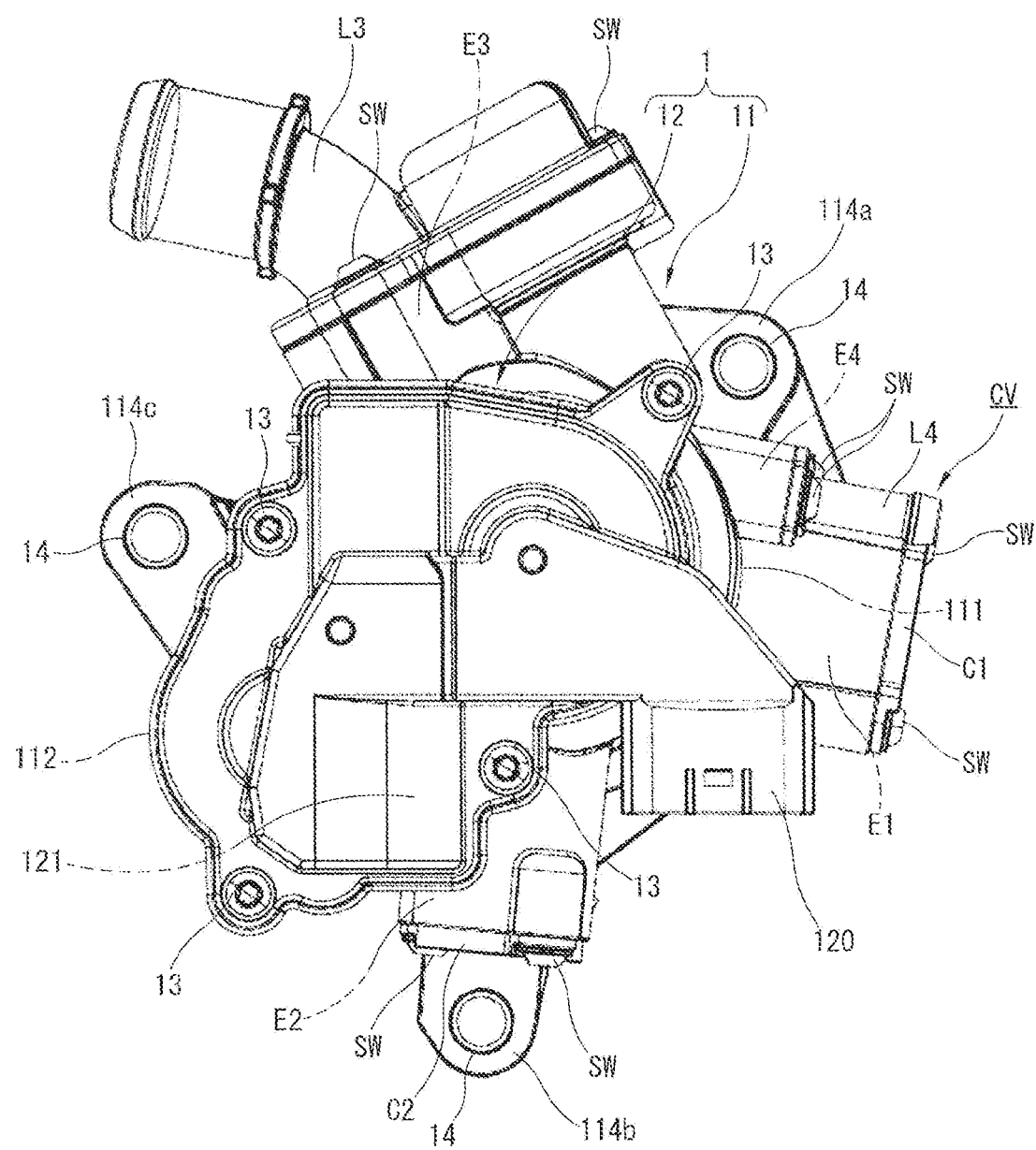
FIG. 4 is a plan view of the control valve in FIG. 3.
Figure 5:
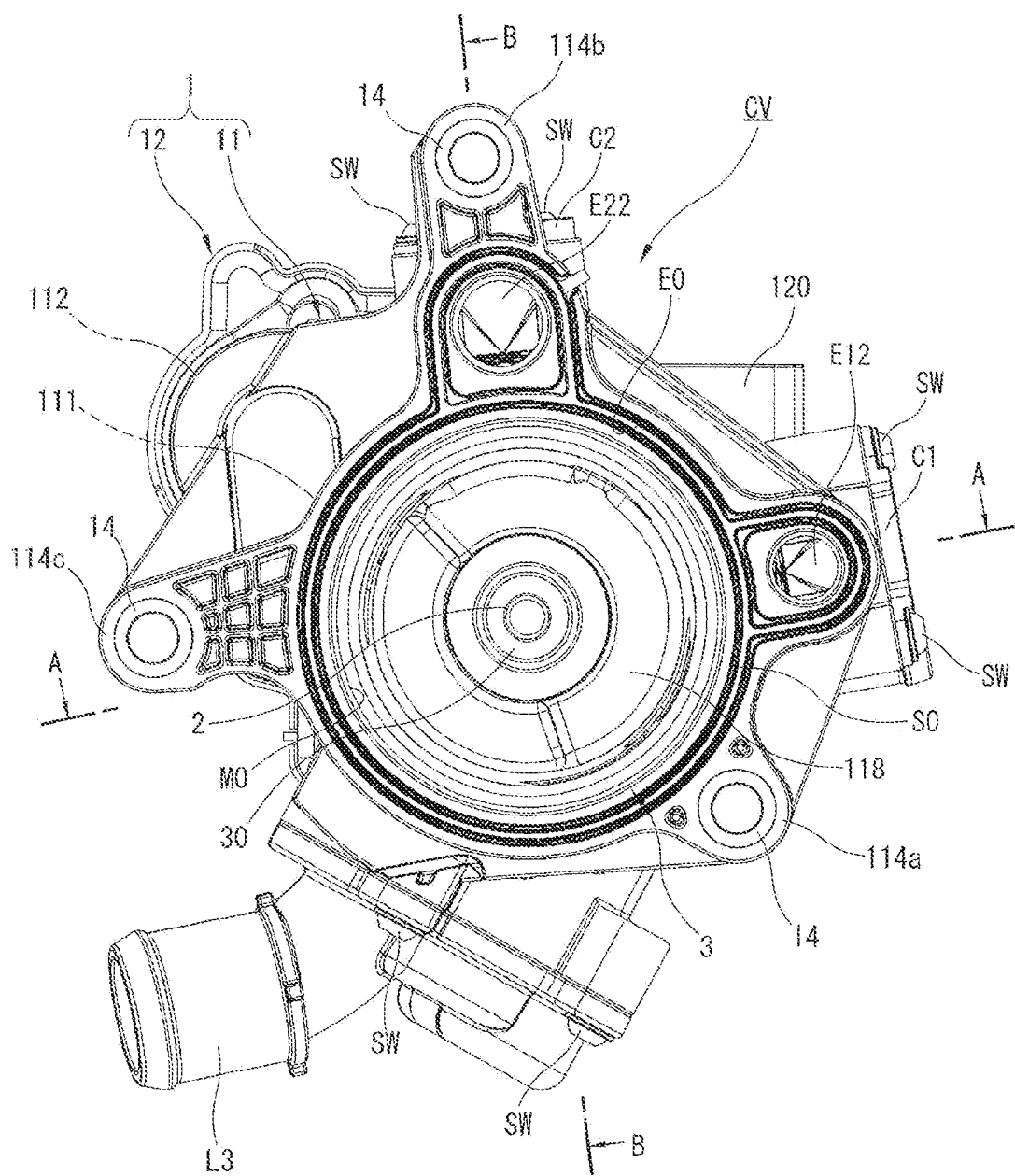
FIG. 5 is a bottom view of the control valve in FIG. 3.

(Configurations of Control Valve) FIG. 2 is an exploded perspective view of control valve CV according to the present invention. FIG. 3 is a perspective view of control valve CV according to the present invention when viewed from a side of a second housing 12. FIG. 4 is a plan view of control valve CV shown in FIG. 3. FIG. 5 is a bottom view of control valve CV shown in FIG. 3. In the following explanation of the drawings, "axial direction" refers to a direction parallel with a rotational axis Z of a rotational shaft 2, and "radial direction" refers to a direction perpendicular to rotational axis Z of rotational shaft 2, and "circumferential direction" refers to a direction around rotational axis Z of rotational shaft 2. Furthermore, in the axial direction, "first side" refers to an upper side in FIG. 2, and "second side" refers to a lower side in FIG. 2.

As shown in FIG. 2, control valve CV includes valve 3, an electric motor 4, and a speed reducer 5. Valve 3 has a tubular shape, and is rotatably supported inside a housing 1 by rotational shaft 2. Electric motor 4 is contained in housing 1, and is structured to rotate valve 3. Speed reducer 5 is contained in housing 1, and is structured to transfer rotation of electric motor 4 with deceleration.

Housing 1 is composed of two components separate in the axial direction: a first housing 11 and a second housing 12. First housing 11 contains valve 3 and electric motor 4. Second housing 12 contains speed reducer 5, and is disposed to close a first side opening of first housing 11. First housing 11 and second housing 12 are both made of a synthetic resin such as a polyphenylene sulfide (PPS), and are fixed to each other with bolts 13.

First housing 11 includes a valve container 111 and a motor container 112. Valve container 111 has a shape of a hollow cylinder, and contains valve 3. Motor container 112 has a shape of a hollow cylinder, and contains a motor body 41 of electric motor 4, and is disposed beside valve container 111 in parallel with valve container 111. First housing 11 includes mounting portions (specifically, flanges 114a, 114b, and 114c described below) in an axial second side end thereof, and is fixed to a cylinder block not shown with fixing members not shown such as bolts, via the mounting portions. The mounting portions and the cylinder block interpose therebetween a gasket S0 having an annular shape and establishing liquid-tight sealing between the mounting portions and the cylinder block.

Figure 6:
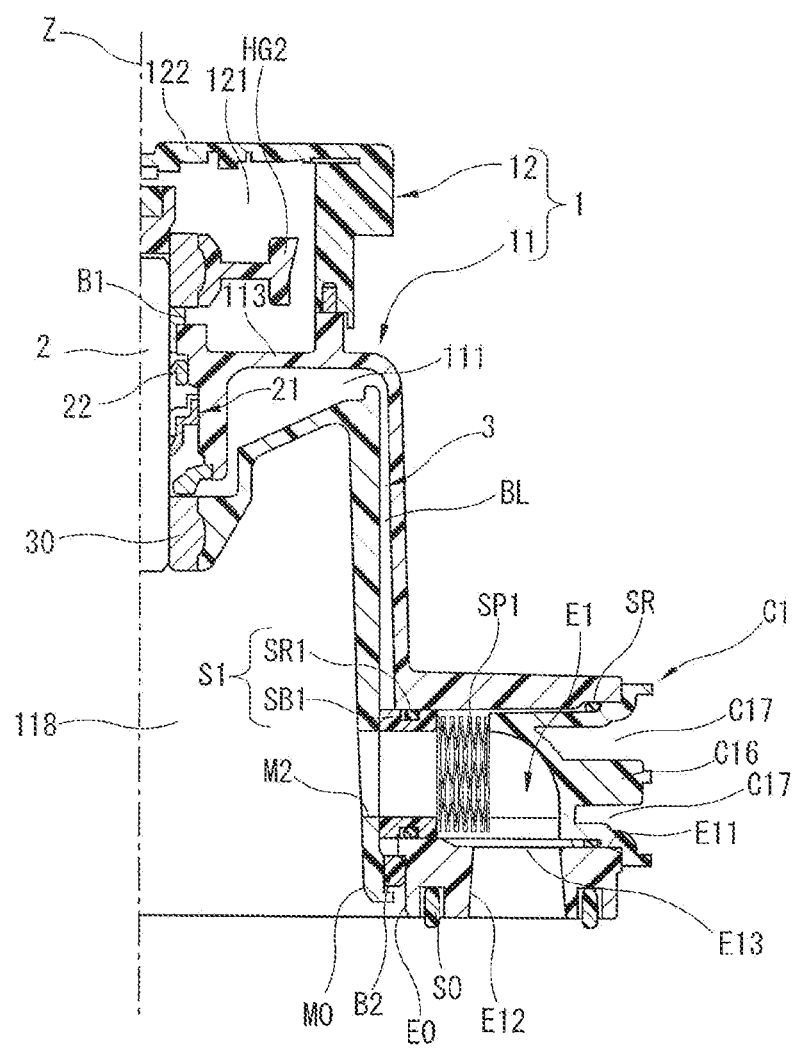
FIG. 6 is a sectional view along a line A-A in FIG. 5.

Valve container 111 includes an axial first side end that is closed by an end wall 113, and an axial second side end that is open (see FIGS. 5 and 6). As shown in FIG. 5, the axial second side end of valve container 111 includes the plurality of flanges 114a, 114b, and 114c (e.g. three in the present embodiment) for mounting the first housing 11 to the cylinder block not shown. Flanges 114a, 114b, and 114c extend outward, substantially in the radial direction, and are arranged at approximately equal intervals in the circumferential direction. Each of flanges 114a, 114b, and 114c includes in its tip a through hole extending in the axial direction and having a circular cross section. Each of the through holes of flanges 114a, 114b, and 114c receives a sleeve 14 that is made of a metal and has a cylindrical shape, wherein sleeve 14 is press-fitted in the each of the through holes. Sleeves 14 are respectively equal to flanges 114a, 114b, and 114c in height (i.e. axial dimension), and are structured to receive axial forces from the bolts not shown.

As shown in FIG. 2, end wall 113 of valve container 111 includes a boss 115 having a shape of a cylinder with a cap and projecting toward second housing 12. Boss 115 includes an end wall including a through hole 116, wherein rotational shaft 2 is inserted in and extends through the through hole 116. End wall 113 of valve container 111 further includes a pair of bearings 117, 117 having shapes of flat plates rising straight and serving as bearings for support shafts 51 and 52 of speed reducer 5. The pair of bearings 117, 117 respectively include bearing holes 117a, 117a that are through holes rotatably supporting the support shafts 51 and 52.

Valve container 111 of first housing 11 includes a side wall (i.e. a peripheral wall) including a first outlet port E1, a second outlet port E2, and a third outlet port E3 that connect valve container 111 to heater HT, oil cooler OC, and radiator RD (see FIG. 1). As shown in FIGS. 2 to 5, first and second outlet ports E1 and E2 out of the outlet ports E1 to E3 are formed to open at the peripheral wall of first housing 11 (see FIG. 2) respectively via first communication passages E11 and E21 being radial through holes, and are formed to open at inner end faces of flanges 114a and 114b (see FIG. 5) respectively via second communication passages E12 and E22 being axial through holes. Second communication passages E12 and E22 are respectively connected to first communication passages E11 and E21 via second communication passage openings E13 and E23 described below (see FIGS. 6 and 7). Thus, first outlet port E1 includes an internal passage not shown that is composed of first communication passage E11 and second communication passage E12 and has a substantially T-shaped longitudinal section. Second outlet port E2 includes an internal passage not shown that is composed of first communication passage E21 and second communication passage E22 and has a substantially T-shaped longitudinal section. First outlet port E1 and second outlet port E2 respectively include outer ends that are closed by a cap C1 and a cap C2 being caps. First outlet port E1 is connected to heater HT via second communication passage E12. Second outlet port E2 is connected to oil cooler OC via second communication passage E22. Besides, each of third outlet port E3 and continuous outlet port E4 (i.e. fourth outlet port E4) has a cylindrical shape, and is formed to open at the peripheral wall of first housing 11. Third outlet port E3 includes an outer end to which third pipe L3 connected to radiator RD is mounted. Fourth outlet port E4 includes an outer end to which a fourth pipe L4 connected to throttle chamber TC is mounted. Incidentally, each of first cap C1, second cap C2, third pipe L3, and fourth pipe L4 is fixed to first housing 11 with screws SW.

Second housing 12 has a shape of a bottomed cylinder that is open to cover both of valve container 111 and motor container 112 straddlingly. Second housing 12 has an inner space that defines speed reducer container 121 to contain speed reducer 5 in a state in which second housing 12 is mounted to first housing 11 so as to cover the valve container 111 and the motor container 112. Second housing 12 includes a connector acceptor 120 for connection with electronic control unit CU, wherein connector acceptor 120 is integrally formed in a side portion of second housing 12. Electronic control unit CU is electrically connected to electric motor 4 via connector acceptor 120.

Electric motor 4 includes motor body 41 and an output shaft 42, wherein motor body 41 is contained in motor container 112 such that output shaft 42 is directed toward second housing 12. Electric motor 4 further includes a flange 43 formed in an end of motor body 41 adjacent to output shaft 42 and shaped to extend radially outwardly. Via flange 43, electric motor 4 is fixed to an opening edge of motor container 112 with bolts 44. Electric motor 4 is driven under control of in-vehicle electronic control unit CU (see FIG. 1), and rotates valve 3 depending on operation conditions of the vehicle. This allows the cooling water to be appropriately distributed to radiator RD etc. (see FIG. 1).

Speed reducer 5 is a drive mechanism including two pairs of skew gears, i.e., a first gear G1 and a second gear G2. First gear G1 is composed of a first worm WG1 and a first worm wheel HG1. First worm WG1 is disposed coaxially with output shaft 42 of electric motor 4, and is structured to rotate integrally with output shaft 42. First worm wheel HG1 is rotatably supported by first support shaft 51 extending perpendicularly to output shaft 42, and engages with first worm WG1. Second gear G2 is composed of a second worm WG2 and a second worm wheel HG2. Second worm WG2 is rotatably supported by second support shaft 52, and is structured to rotate integrally with first worm wheel HG1. Second worm wheel HG2 is fixed to rotational shaft 2, and engages with second worm WG2. First worm wheel HG1 and second worm WG2 are parts of a cylindrical composite gear member in which first worm wheel HG1 and second worm WG2 having tubular shapes are arranged in series and are integrally formed. Thus, first worm wheel HG1 and second worm WG2 are rotatably supported by the pair of bearings 117, 117 of first housing 11, via first and second support shafts 51 and 52 inserted in both ends of the composite gear member. This allows a rotational drive force outputted from output shaft 42 of electric motor 4 to be transferred to valve 3 with two-step deceleration via first gear G1 and second gear G2.

Figure 7:
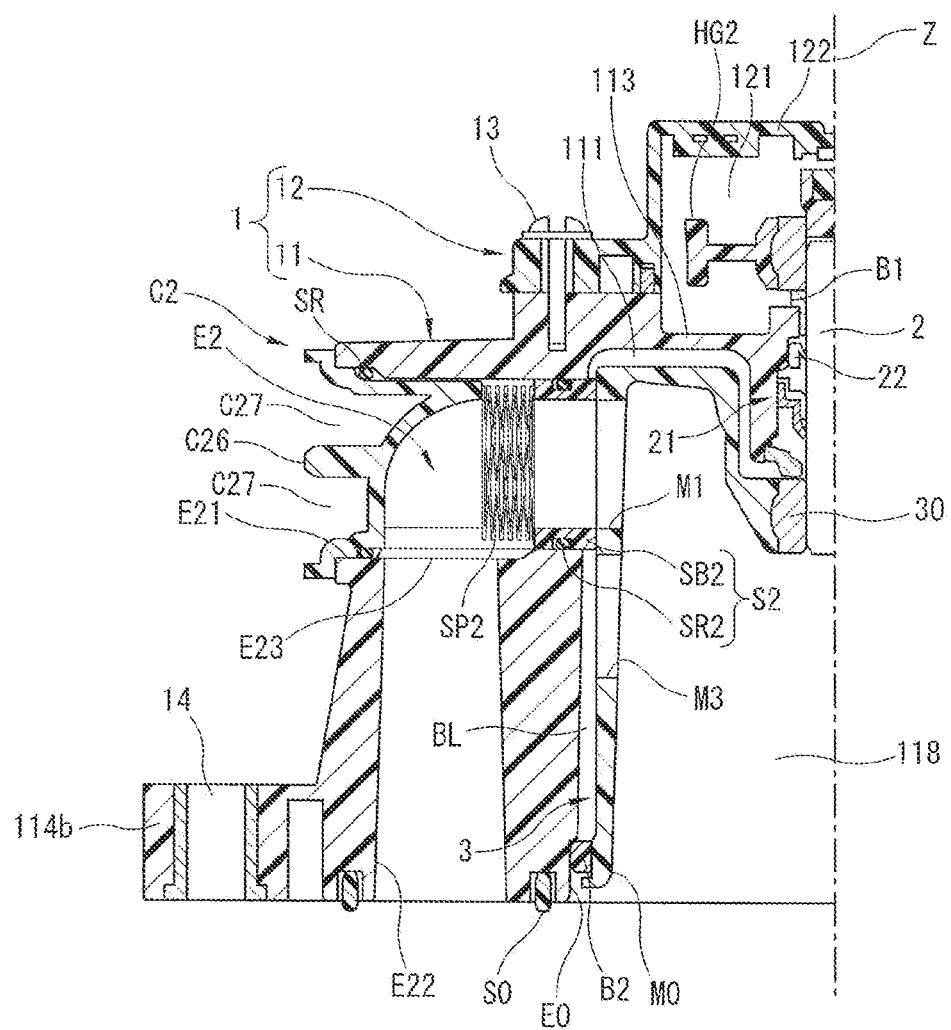
FIG. 7 is a sectional view along a line B-B in FIG. 5.

FIG. 6 is a sectional view of control valve CV at a section along a line A-A shown in FIG. 5. FIG. 7 is a sectional view of control valve CV at a section along a line B-B shown in FIG. 5. In the following explanation of the drawings, the axial direction refers to the direction parallel with rotational axis Z of rotational shaft 2, and the radial direction refers to the direction perpendicular to rotational axis Z of rotational shaft 2, and the circumferential direction refers to the direction around rotational axis Z of rotational shaft 2. Furthermore, in the axial direction, "first side" refers to an upper side in FIGS. 6 and 7, and "second side" refers to a lower side in FIGS. 6 and 7.

As shown in FIGS. 6 and 7, valve container 111 of first housing 11 has the shape of bottomed cylinder, and includes the axial first side end that is closed by end wall 113 and the axial second side end that is open to the outside. End wall 113 of valve container 111 includes boss 115 including through hole 116 in which rotational shaft 2 is inserted. Through hole 116 extends in the axial direction so as to establish communication between valve container 111 and speed reducer container 121 described below. In other words, through hole 116 is positioned axially oppositely to an opening of an inlet port E0 described below, and opens to valve container 111.

Second housing 12 mounted to first housing 11 from the first side has the shape of bottomed tube, and includes an axial first side end that is closed by a bottom wall 122 and an axial second side end that is open and faces end wall 113. Second housing 12 is placed over first housing 11 so as to close the axial first side end of first housing 11. This forms speed reducer container 121 in the internal space of second housing 12. Then, speed reducer container 121 contains speed reducer 5.

First housing 11 includes inlet port E0 that is open at the axial second side end of valve container 111. Inlet port E0 is in communication with an inside of the cylinder block not shown, and serves as a primary communication port for introduction of the cooling water from the cylinder block. In detail, inlet port E0 is in communication with an opening of the cylinder block, in a state in which control valve CV is mounted to the engine not shown (i.e. to the cylinder block). This allows the cooling water to be introduced from the cylinder block to valve container 111 via inlet port EQ.

Valve container 111 includes the peripheral wall in which first outlet port E1, second outlet port E2, third outlet port E3 are formed as secondary communication ports establishing communication between valve container 111 and the outside, wherein each of the secondary communication ports has a substantially circular cross section. In other words, in the peripheral wall of valve container 111, first to third outlet ports E1 to E3 being the secondary communication ports are formed to extend and open in the radial direction, and valve container 111 is in communication with outside of first housing 11 via first to third outlet ports E1 to E3.

Out of the first to third outlet ports E1 to E3, first outlet port E1 includes the internal passage that is a through passage with the substantially T-shaped longitudinal section composed of first communication passage E21 and second communication passage E22. Second outlet port E2 has the internal passage that is a through passage with the substantially T-shaped longitudinal section composed of first communication passage E21 and second communication passage E22. Thus, the T-shaped internal passages are composed of first communication passages E11 and E21 and second communication passages E12 and E22, wherein: first communication passages E11 and E21 extend through the peripheral wall of valve container 111 in the radial direction; and second communication passages E12 and E22 respectively extend through peripheral walls of first communication passages E11 and E21 in the axial direction. First communication passages E11 and E21 establish communication between valve container 111 and the outside of first housing 11, and include the outer ends respectively closed by first and second caps C1 and C2. Second communication passages E12 and E22 include first ends respectively connected to middle portions of first communication passages E11 and E21 via second communication passage openings E13 and E23, and include second ends that are respectively open at the inner end faces of flanges 114a and 114b. In other words, first outlet port E1 is open extending from the inner end face of flange 114a to the outside of first housing 11, via the internal passage composed of first communication passage E11 and second communication passage E12. Second outlet port E2 is open extending from the inner end face of flange 114b to the outside of first housing 11, via the internal passage composed of first communication passage E21 and second communication passage E22. On the other hand, third outlet port E3 is connected to third pipe L3 that includes a middle portion bent at a substantially right angle so as to have a substantially L-shape.

First outlet port E1 is connected to heater HT via first communication passage E11 and second communication passage E12. Specifically, the cooling water discharged from the inner end face of flange 114a via first outlet port E1 is supplied to heater HT via the cylinder block not shown. Second outlet port E2 is connected to oil cooler OC via first communication passage E21 and second communication passage E22. Specifically, the cooling water discharged from the inner end face of flange 114b via second outlet port E2 is supplied to oil cooler OC via the cylinder block not shown. Third outlet port E3 is connected to radiator RD via third pipe L3.

First outlet port E1, second outlet port E2, and third outlet port E3 are different from each other in axial position. Simultaneously, first outlet port E1, second outlet port E2, and third outlet port E3 are arranged at axial intervals set to allow a first seal member S1, a second seal member S2, and a third seal member S3 described below to respectively overlap with a first opening M1, a second opening M2, and a third opening M3 described below, wherein the first to third openings M1 to M3 are arranged in valve 3 at adjacent axial positions. Furthermore, first to third outlet ports E1 to E3 are different from each other in circumferential position. Specifically, first to third outlet ports E1 to E3 are arranged in the peripheral wall of first housing 11, at approximately 90° intervals in phase (see FIG. 4).

Each of first to third outlet ports E1 to E3 includes an inner end provided with a seal mechanism establishing gas-tight sealing between the each of first to third outlet ports E1 to E3 and valve 3, wherein the inner ends of first and second outlet ports E1 and E2 are respectively equivalent to inner ends of first communication passages E11 and E21. Each of the seal mechanisms of first to third outlet ports E1 to E3 is composed of a corresponding one of first to third seal members S1 to S3 and a corresponding one of first to third springs SP1 to SP3. Each of first to third seal members S1 to S3 is made of a synthetic resin, and has a substantially cylindrical shape. Each of first to third springs SP1 to SP3 has a substantially cylindrical shape, and biases a corresponding one of first to third seal members S1 to S3 toward valve 3.

Each of first to third seal members S1 to S3 includes a corresponding one of first to third seal bodies SB1 to SB3 and a corresponding one of first to third seal rings SR1 to SR3. Each of first to third seal bodies SB1 to SB3 has a cylindrical shape, and is in sliding contact with an outer peripheral surface of valve 3. Each of first to third seal rings SR1 to SR3 is in sliding contact with an inner peripheral surface of a corresponding one of first to third outlet ports E1 to E3. Each of first to third seal bodies SB1 to SB3 is made of a predetermined fluororesin such as a polytetrafluoroethylene (PTFE), and is contained in an interior of a corresponding one of first to third outlet ports E1 to E3 (in detail, contained in first inner peripheral sections E111 and E211 described below in case of first outlet port E1 and E2), so as to be movable in a direction toward valve 3. Each of first to third seal rings SR1 to SR3 is a so-called X-ring having a X-shaped cross section, and is mounted to an outer periphery of a corresponding one of first to third seal bodies SB1 to SB3.

Each of first to third springs SP1 to SP3 is a metallic plate spring formed by coiling a wire that has a substantially rectangular cross section. Thus, each of first to third springs SP1 to SP3 is a bias member that is disposed between a corresponding one of first cap C1, second cap C2, and third pipe L3 and a corresponding one of first to third seal bodies SB1 to SB3, with a predetermined set load, and biases a corresponding one of first to third seal members S1 to S3 toward valve 3.

Rotational shaft 2 has a rod shape with a constant outer diameter, and extends over valve container 111 and speed reducer container 121 through the through hole 116, and is rotatably supported by a bearing B1 contained and retained on an inner periphery of boss 115. Rotational shaft 2 and through hole 116 interpose therebetween a seal member 21 that has a cylindrical shape and is press-fittingly inserted from a side of valve container 111, in order to establish liquid-tight sealing between rotational shaft 2 and through hole 116. Seal member 21 suppresses the cooling water in valve container 111 from flowing into second housing 12 via through hole 116. Furthermore, seal member 21 and bearing B1 are accompanied by a dust seal 22 disposed therebetween. Dust seal 22 suppresses dust in speed reducer container 121 from intruding into valve container 111. This serves to reduce dust jamming between through hole 116 and seal member 21, and thereby protect seal member 21.

Valve 3 is made of a predetermined rigid resin, and has a shape of a bottomed cylinder with a constant outer diameter. Valve 3 includes an inlet M0 being an opening at a second side end of valve 3 and facing the intake port E0. This allows the cooling water to be introduced to an internal passage 118 formed in an inner circumferential part of valve 3. Valve 3 includes a first side end in the axial direction which is press-fitted to rotational shaft 2 via an insertion member 30 made of a metal and embedded in an inner periphery of the first side end of valve 3. The second side end of valve 3 facing the intake port E0 is rotatably supported by a bearing B2 retained on an inner periphery of intake port E0.

Valve 3 includes, in its peripheral wall, first opening M1, second opening M2, and third opening M3 each of which extends through the peripheral wall of valve 3 in the radial direction. First to third openings M1 to M3 respectively corresponds in axial position to first to third outlet ports E1 to E3 of first housing 11. This allows each of first to third openings M1 to M3 to communicate with the corresponding one of first to third outlet ports E1 to E3, at a predetermined rotational position (i.e. a predetermined phase). In addition, first to third openings M1 to M3 are set with a number and shapes (e.g. circles, circumferentially elongated ovals, etc.) depending on how to control the valve 3.

Thus-configured control valve CV distributes the cooling water to heater HT via first outlet port E1, when valve 3 is at a circumferential position at which first opening M1 overlaps with first outlet port E1 at least partially. Similarly, control valve CV distributes the cooling water to oil cooler OC via second outlet port E2, when valve 3 is at a circumferential position at which second opening M2 overlaps with second outlet port E2 at least partially. Control valve CV distributes the cooling water to radiator RD via third outlet port E3 (i.e. via third pipe L3), when valve 3 is at a circumferential position at which third opening M3 overlaps with third outlet port E3 at least partially. Upon the distribution of the cooling water, the flow rate of the distributed cooling water varies depending on overlapping conditions (i.e. overlapping areas) between first to third openings M1 to M3 and first to third outlet ports E1 to E3.

The following details first outlet port E1 and second outlet port E2. First outlet port E1 and second outlet port E2 are different from each other in position of the openings, but similar each other in the other configurations. Accordingly, the following explains only about first outlet port E1 with reference to FIGS. 8 to 13, for convenience. In other words, the following explanation about first outlet port E1 applies also to second outlet port E2.

Figure 8:
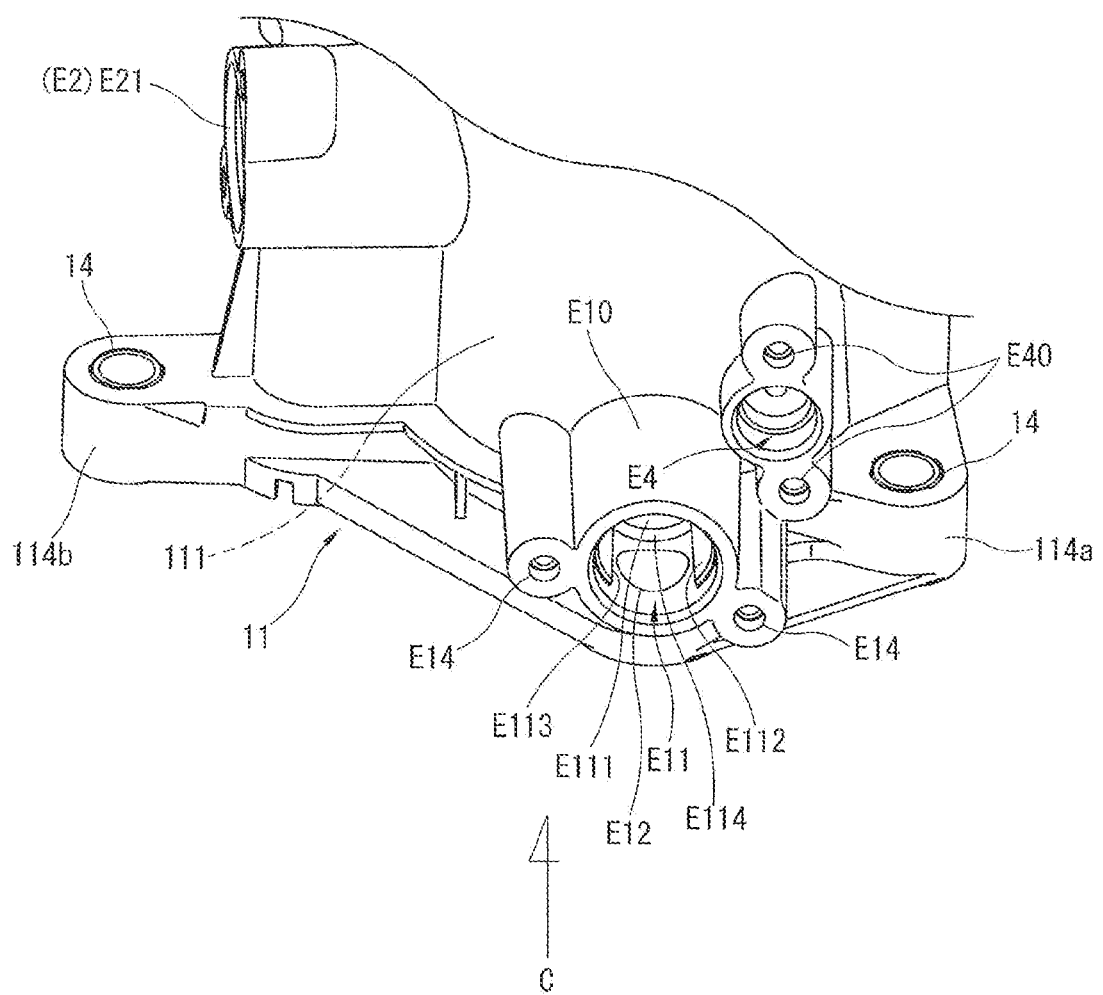
FIG. 8 is a perspective view of a first housing in FIG. 2.
Figure 9:
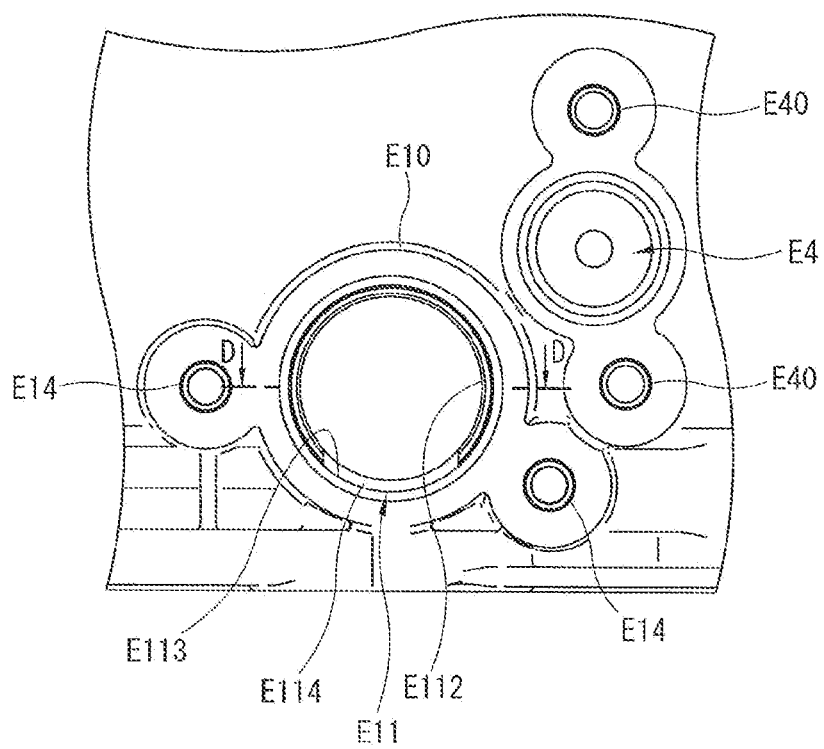
FIG. 9 is a view in a direction of an arrow C in FIG. 8.
Figure 10:
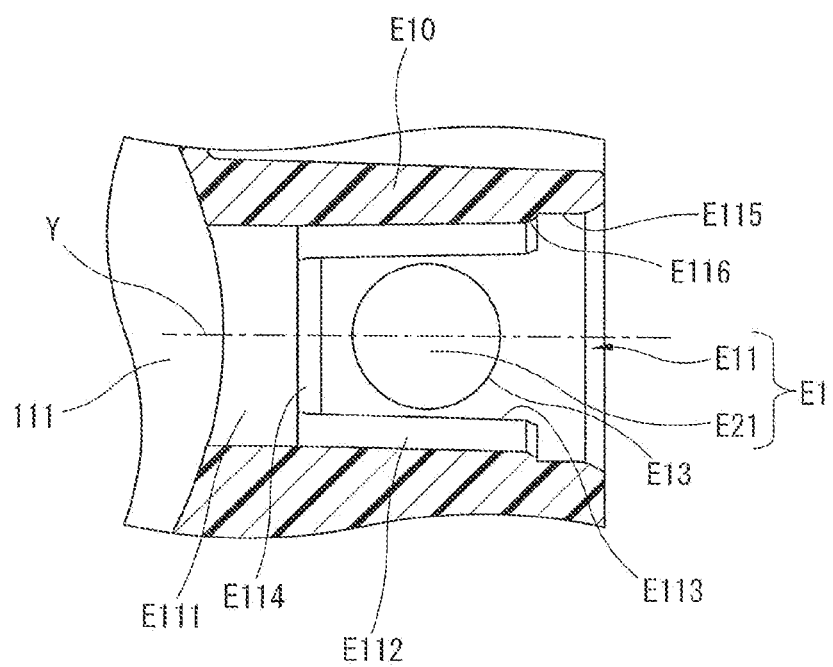
FIG. 10 is a sectional view along a line D-D in FIG. 9.
Figure 11:
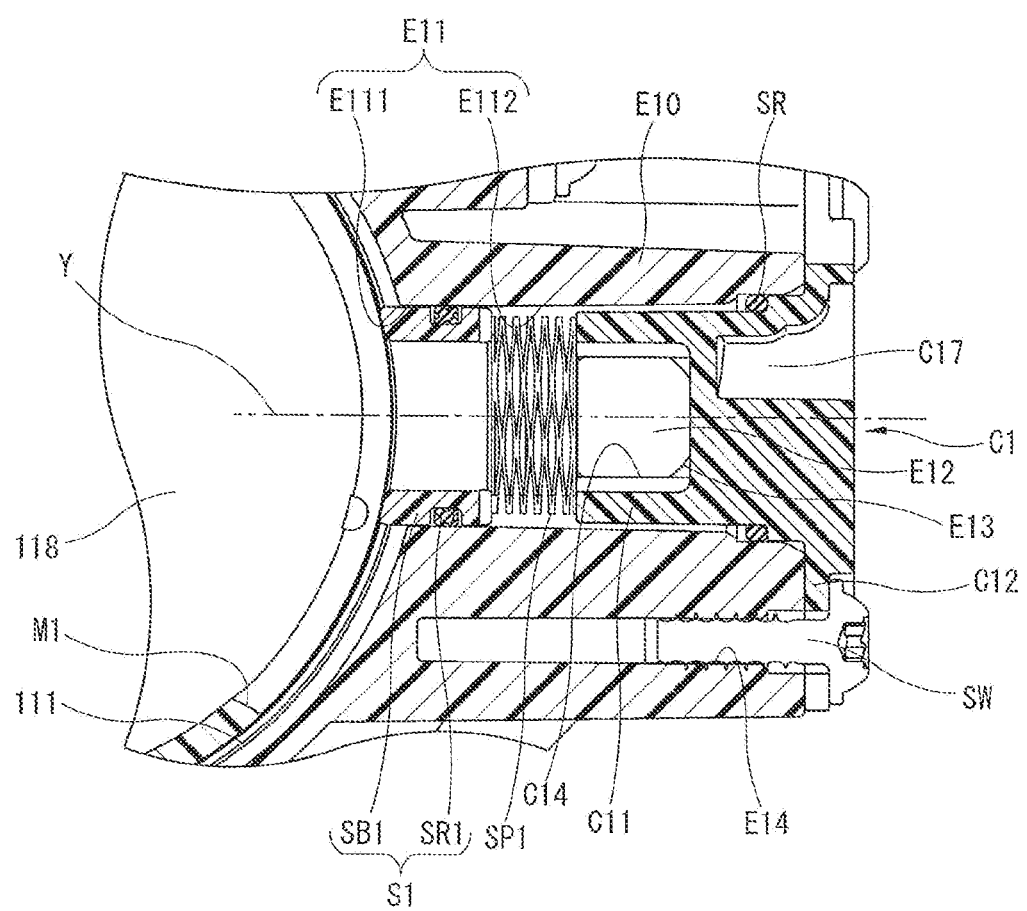
FIG. 11 is a sectional view along a line E-E in FIG. 3.
Figure 12A:
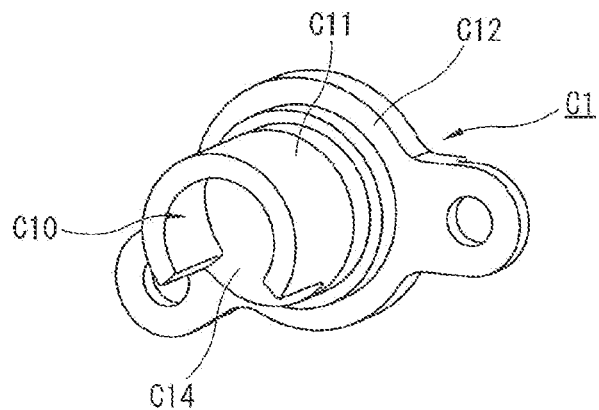
FIGS. 12A, 12B, and 12C are views extracting a first cap in FIG. 2.
Figure 12B:
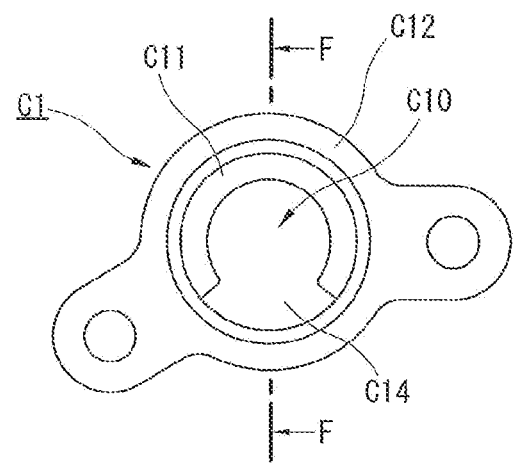
Figure 12C:
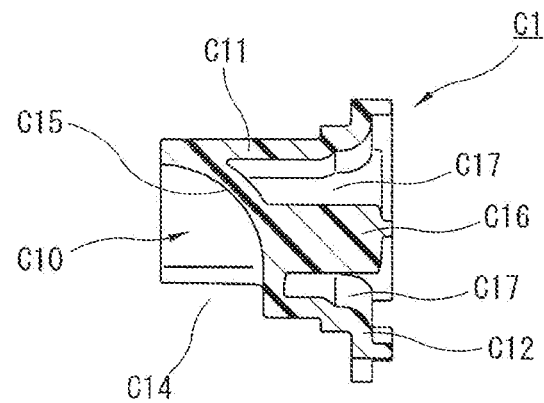

FIG. 8 is a perspective view showing first housing 11 from a diagonally upper side, i.e. a side of second housing 12, with first communication passage E11 of first outlet port E1 placed front. FIG. 9 is a view in a direction of an arrow C shown in FIG. 8, which enlarges a part of first housing 11: specifically, enlarges a part involving first communication passage E11. FIG. 10 is a longitudinal sectional view of first communication passage E11 at a section along a line D-D shown in FIG. 9. FIG. 11 is a longitudinal sectional view of first communication passage E11 at a section along a line E-E shown in FIG. 3, and involves, in addition to first communication passage E11 in FIG. 10, first seal member S1 and first spring SP1 and first cap C1 inserted inside the first communication passage E11. FIGS. 12A, 12B, and 12C extract first cap C1 shown in FIG. 2. FIG. 12A is a perspective view of first cap C1. FIG. 12B is a front view of first cap C1. FIG. 12C is a sectional view at a section along a line F-F shown in FIG. 12B. In the following explanation of the drawings, the axial direction refers to the direction parallel with rotational axis Z of rotational shaft 2, and the radial direction refers to the direction perpendicular to rotational axis Z of rotational shaft 2, and the circumferential direction refers to the direction around rotational axis Z of rotational shaft 2.

As shown in FIGS. 8 and 10, first outlet port E1 is the continuous internal passage (see FIG. 6) that has the substantially T-shaped longitudinal section and is composed of first communication passage E11 and second communication passage E12, wherein: first communication passage E11 extends through the peripheral wall of valve container 111 in the radial direction so as to establish communication between valve container 111 and the outside; and second communication passage E12 is connected to a middle portion of first communication passage E11 via second communication passage opening E13 so as to establish communication between first communication passage E11 and the outside. The outer end of first communication passage E11 is closed by first cap C1. Accordingly, the cooling water in first communication passage E11 flows from valve container 111 into first communication passage E11, and into second communication passage E12 via second communication passage opening E13, and then is discharged from the outer end of second communication passage E12 that is open at the inner end face of flange 114a.

As shown in FIGS. 8 and 9, first communication passage E11 is the internal passage with the substantially circular cross section, which is defined inside a first communication passage constituent E10 having a substantially cylindrical shape and projecting from the peripheral wall of valve container 111 in the radial direction. First communication passage constituent E10 is accompanied by a pair of internal screw holes E14, E14 disposed at both sides of first communication passage constituent E10, for mounting and fixing of first cap C1. Adjacently to first communication passage constituent E10, fourth outlet port E4 is formed to open there, and is accompanied by a pair of internal screw holes E40, E40 disposed at both sides of fourth outlet port E4 for mounting and fixing of a fourth pipe L4.

As shown in FIGS. 8 to 11, first communication passage E11 includes a first inner peripheral section E111 and a second inner peripheral section E112. First inner peripheral section E111 is structured to contain and retain first seal member S1. Second inner peripheral section E112 is disposed to overlap with second communication passage E12 (i.e. overlap with second communication passage opening E13) in position in a bias direction of first spring SP1 along a central axis Y of first communication passage E11, and is structured to contain and retain first spring SP1 and first cap C1. Furthermore, first communication passage E11 includes a continuous curved surface via which first inner peripheral section E111 and second inner peripheral section E112 are smoothly connected to each other. The curved surface has a substantially conically tapered shape that gradually increases in inner diameter from first inner peripheral section E111 toward second inner peripheral section E112. This conically-tapered curved surface serves as a so-called draft taper upon die molding of first communication passage E11.

First inner peripheral section E111 has a predetermined inner diameter so as to be in contact with the outer periphery of first seal member S1: in detail, so as to be in elastic contact with first seal ring SR1 disposed in the outer periphery of first seal body SB1. This allows first inner peripheral section E111 to slidably retain first seal member S1. First communication passage E11 has a region sufficient to contain a rear end of first seal member S1 (i.e. a rear end of first seal body SB1) being in contact with first spring SP1, in a state in which first spring SP1 and first cap C1 are installed, i.e., in a state in which first spring SP1 biases first seal member S1.

Second inner peripheral section E112 is positioned outside (i.e. oppositely to valve container 111) with respect to first inner peripheral section E111, and contains and retains first spring SP1 and first cap C1. Second inner peripheral section E112 has an inner diameter that is slightly greater than an outer diameter of first spring SP1 and an outer diameter of first cap C1. Although second inner peripheral section E112 has a slight gap with first spring SP1 and first cap C1, the inner diameter of second inner peripheral section E112 is set to allow second inner peripheral section E112 to guide first spring SP1 and first cap C1 upon insertion of them.

Second inner peripheral section E112 is accompanied by a depression E113 extending in the direction of central axis Y that is a direction of the biasing by first spring SP1. Depression E113 is sunken with respect to an inner peripheral surface of second inner peripheral section E112, in a radial direction with respect to central axis Y, such that a distance R2 from central axis Y to depression E113 is greater than a distance R1 from central axis Y to the inner peripheral surface of second inner peripheral section E112. Depression E113 is formed by cutting an inner peripheral wall of second inner peripheral section E112 such that: depression E113 has a rectangular shape at a section in the direction of central axis Y; and depression E113 has a substantially rectangular shape in a plan view when viewed from the opening in the radial direction with respect to central axis Y, as shown in FIG. 10. Furthermore, depression E113 has a circumferential width W2 around central axis Y which is slightly greater than an inner diameter R3 of second communication passage E12, and has an axial width Lx along central axis Y which is longer than circumferential width W2. On the other hand, in a circumference of first communication passage E11, second inner peripheral section E112 has a circumferential width W1 to occupy a region wider than 180° in angular range (see FIG. 9) such that circumferential width W1 of second inner peripheral section E112 is greater than circumferential width W2 of depression E113. This configuration of setting the circumferential width W1 of second inner peripheral section E112 to be greater than circumferential width W2 of depression E113 allows second inner peripheral section E112 to serve as a guide upon insertion of first spring SP1 and thereafter retain first spring SP1.

Depression E113 is connected to first inner peripheral section E111 via, for example, a slope E114. Slope E114 in the present embodiment has a conically tapered surface defined such that a distance Rx from central axis Y to slope E114 gradually decreases toward first inner peripheral section E111. For another example, depression E113 may be connected to first inner peripheral section E111 not via slope E114 but via a curved surface that has a longitudinal section of a convex or concave arc shape.

Second inner peripheral section E112 includes an outer end that faces a seal surface E115. Seal surface E115 is structured to be in elastic contact with an O-ring SR mounted to an outer periphery of first cap C1, and is greater in diameter than second inner peripheral section E112 so as to define a step therebetween. As shown in FIG. 11, the elastic contact between seal surface E115 and O-ring SR on the outer periphery of first cap C1 suppresses foreign substances from intruding from the outside into the interior of first communication passage E11 via a minute gap between first cap C1 and first communication passage E11. Seal surface E115 is smoothly connected to second inner peripheral section E112 via a slope E116 that is a conically tapered surface gradually decreasing in inner diameter toward second inner peripheral section E112.

As shown in FIGS. 12A to 12C, first cap C1 includes a communication passage insertion section C11, a mounting base section C12, and a seal seat section C13. Communication passage insertion section C11 substantially has a shape of a bottomed cylinder, and is inserted in first communication passage E11. Mounting base section C12 has a shape of a flange projecting from a bottom end of communication passage insertion section C11, and serves for mounting to first housing 11: in detail, mounting to first communication passage constituent E10. Seal seat section C13 is disposed at an end of communication passage insertion section C11 adjacent to mounting base section C12, and has a shape of a diameter-increasing step so as to serve as a seat for O-ring SR.

Communication passage insertion section C11 includes a peripheral wall with a C-shaped cross section which is partially discontinuous in a circumference around central axis Y. In other words, the peripheral wall of the communication passage insertion section C11 includes a cutout portion C14 extending in the direction of central axis Y. Cutout portion C14 is formed by cutting off a part of the peripheral wall: specifically, a circumferentially partial region around central axis Y of the peripheral wall. In more detail, the peripheral wall of communication passage insertion section C11 occupies a circumferential region corresponding to second inner peripheral section E112, while cutout portion C14 occupies a circumferential region corresponding to depression E113. According to these configurations, communication passage insertion section C11 includes inside it a communication portion C10 that establishes communication between first inner peripheral section E111 and second communication passage E12. Communication portion C10 is connected to first inner peripheral section E111 via a top opening of communication passage insertion section C11, and is connected to second communication passage E12 via cutout portion C14. This allows the cooling water to flow from first inner peripheral section E111 into communication portion C10, and then be introduced into second communication passage E12 via cutout portion C14.

In the direction of central axis Y, communication portion C10 extends to reach a position tangential to an opening edge of second communication passage E12. Accordingly, the cooling water that has flowed into communication portion C10 is smoothly guided to second communication passage E12 along an inner end face (i.e. an end face adjacent to mounting base section C12) of communication portion C10. Furthermore, the inner end face of communication portion C10 includes a curved surface C15 having a substantially arc-shaped longitudinal section, wherein an inner diameter of communication portion C10 (i.e. an inner diameter of communication passage insertion section C11) gradually decreases toward mounting base section C12. Accordingly, the cooling water that has flowed from first inner peripheral section E111 into communication passage insertion section C11 is smoothly guided toward cutout portion C14 (i.e. toward second communication passage E12) along curved surface C15.

First cap C1 includes a plurality of ribs C16 formed adjacently to the end of communication passage insertion section C11 adjacent to mounting base section C12, outside of communication passage insertion section C11. Ribs C16 are arranged to extend radially, and each pair of adjacent two ribs C16 interpose a thinned portion C17 therebetween. This configuration of forming ribs C16 and thinned portions C17 serves to reduce a weight of first cap C1 while establishing rigidity of first cap C1.

Mounting base section C12 has the flange shape that includes an outer periphery from which a pair of mounting portions C18, C18 extend. Each of mounting portions C18, C18 receives screw SW piercing it, for mounting and fixing of first cap C1. Thus, the pair of mounting portions C18, C18 correspond to the pair of internal screw holes E14, E14 of first housing 11. Screws SW piercing the mounting portions C18, C18 are screwed into internal screw holes E14, E14 of first housing 11. This fixes first cap C1 to first housing 11.

Figure 13A:
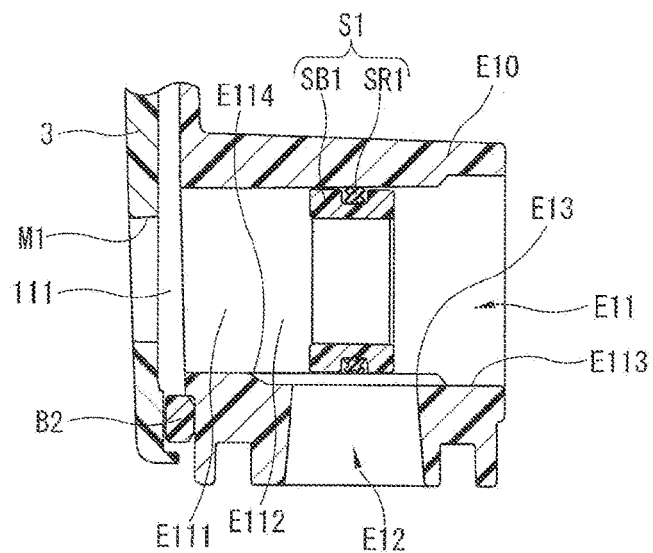
FIGS. 13A, 13B, and 13C are views showing installation processes of a first seal member.
Figure 13B:
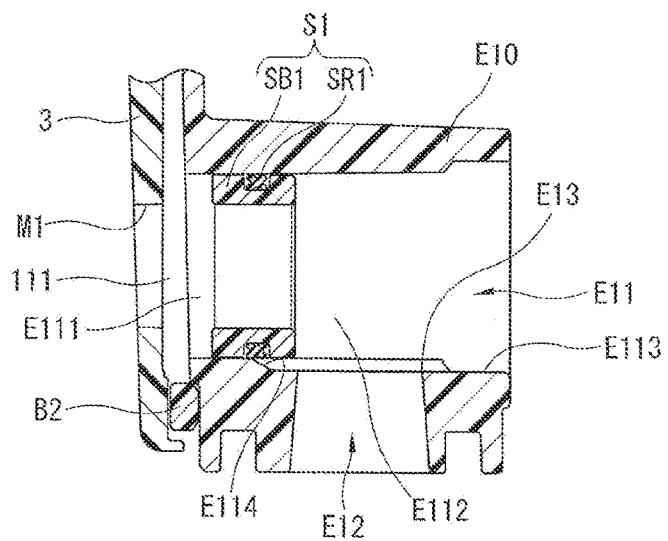
Figure 13C:
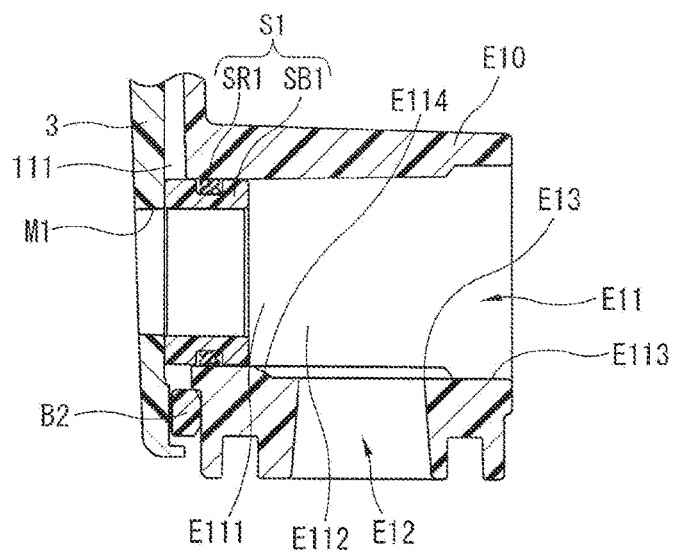

(Installation Processes of Seal Member) FIGS. 13A, 13B, and 13C are views showing installation processes of first seal member S1. FIG. 13A shows a state in which first seal member S1 has been inserted into second inner peripheral section E112. FIG. 13B shows a state immediately before seal member S1 is inserted into first inner peripheral section E111. FIG. 13C shows a state in which first seal member S1 has been inserted into first inner peripheral section E111.

First, as shown in FIG. 13A, first seal member S1 in which first seal ring SR1 has been beforehand mounted to the outer periphery of first seal body SB1 is inserted into second inner peripheral section E112 of first communication passage E11 via the outer opening of first communication passage constituent E10. According to the present embodiment, second communication passage opening E13 is formed in a bottom face of depression E113 depressed in the radial direction with respect to central axis Y, wherein depression E113 is farther in distance from central axis Y than the inner peripheral surface of second inner peripheral section E112 (i.e. R1<R2). This serves to suppress first seal ring SR1 from contacting with the opening edge of second communication passage opening E13 upon passing over second communication passage opening E13 as shown in the drawing, although first seal ring SR1 is in sliding contact with the inner peripheral surface of second inner peripheral section E112 during a process of advancing the first seal member S1 inside the second inner peripheral section E112.

Subsequently, as shown in FIG. 13B, first seal ring SR1 reaches an interior of first inner peripheral section E111 after passing through the depression E113. On this occasion, first seal ring SR1 may partially drops into depression E113 depending on circumferential width W2 of depression E113. However, according to the present embodiment, depression E113 is connected to first inner peripheral section E111 via slope E114. This allows even first seal ring SR1 that has dropped into depression E113, to smoothly entering the interior of first inner peripheral section E111 via slope E114.

After first seal ring SR1 enters the interior of first inner peripheral section E111, as shown in FIG. 13C, first seal member S1 is pushed to a position to allow a head of first seal member S1 to be in contact with the outer peripheral surface of valve 3. First seal member S1 is contained and retained in first inner peripheral section E111, where first seal ring SR1 is in elastic sliding contact with the inner peripheral surface of first inner peripheral section E111, and thereby establishes liquid-tight sealing between first seal body SB1 and first communication passage E11 (i.e. first seal body SB1 and first inner peripheral section E111).

Thereafter, as shown in FIG. 11, first spring SP1 is inserted into second inner peripheral section E112 of first communication passage E11 via the outer opening of first communication passage constituent E10. Finally, communication passage insertion section C11 of first cap C1 is inserted into second inner peripheral section E112 via the outer opening of first communication passage constituent E10, and mounting base section C12 of first cap C1 is fixed to first housing 11 with screws SW, and then the installation of the seal mechanism in first outlet port E1 is finished.

(Effects of Present Embodiment) In the second inner peripheral section of the conventional control valve, the bias member is disposed and contained in the inner circumferential part of the cap, wherein the bias member and the cap are respectively shaped cylindrical and overlap with each other in the radial direction of the bias member and the cap. Accordingly, the bias member and the inner peripheral surface of the second inner peripheral section have the gap therebetween for insertion of the cap, and the bias member before inserting the cap is movable in the radial direction of the bias member, within the extent of the gap. This allows the bias member to move in its radial direction upon inserting the seal member and the bias member and the cap in this order into the first communication passage via the outer opening of the first communication passage, and thereby may cause failure in installation of the bias member in which the bias member is incorrectly sandwiched between the seal member and the cap.

Furthermore, the conventional control valve described above includes a second communication passage including an opening formed in the inner peripheral surface of the second inner peripheral section. This may cause, in the second inner peripheral section, interference between the opening of the second communication passage and the outer periphery of the seal member when the seal member passes over the opening of the second communication passage, which may damage the seal member.

On the other hand, the control valve according to the present embodiment produces the following effects, and thereby serves to solve the problem of the conventional control valve.

Control valve CV includes: housing 1 (i.e. first housing 11) including valve container 111 formed in housing 1, first communication passage E11 formed in valve container 111 so as to be open to outside of housing 1, the opening (i.e. second communication passage opening E13) formed in housing 1 so as to be open to first communication passage E11, and second communication passage E12 being in communication with first communication passage E11 via the opening (i.e. second communication passage opening E13); valve 3 structured to be rotated by the actuator (i.e. electric motor 4) and change a state of communication between valve container 111 and first communication passage E11 depending on rotational position of the valve 3; the seal member (i.e. first seal member S1) disposed inside the first communication passage E11 and structured to be in contact with first communication passage E11 so as to establish sealing between first communication passage E11 and valve 3; the bias member (i.e. first spring SP1) disposed inside the first communication passage E11 and structured to bias the seal member (i.e. first seal member S1) toward valve 3; and the cap (i.e. first cap C1) disposed inside the first communication passage E11 and structured to shut off communication between first communication passage E11 and the outside of housing 1 while allowing communication between first communication passage E11 and second communication passage E12, wherein first communication passage E11 includes: first inner peripheral section E111 structured to be in contact with the outer periphery of the seal member (first seal member S1), in the radial direction with respect to the bias direction of the bias member (first spring SP1); second inner peripheral section E112 disposed to overlap with the opening (second communication passage opening E13) in position in the bias direction of the bias member (first spring SP1), and structured to retain the bias member (first spring SP1); and depression E113 disposed to overlap with second inner peripheral section E112 in position in the bias direction of the bias member (first spring SP1), and depressed in the radial direction with respect to the bias direction of the bias member (first spring SP1).

Thus, first communication passage E11 of control valve CV according to the present embodiment includes second inner peripheral section E112 structured to retain first spring SP1, and includes depression E113 depressed in the radial direction and formed to occupy a partial region of second inner peripheral section E112 in the circumferential direction and overlap with second communication passage opening E13 in position in the bias direction of first spring SP1. This allows the inner peripheral surface of second inner peripheral section E112 to support first spring SP1 upon inserting first spring SP1 into first communication passage E11. This facilitates appropriate installation of first spring SP1 to second inner peripheral section E112, and suppresses failure in installation of first spring SP1.

Furthermore, in control valve CV according to the present embodiment, second communication passage opening E13 is formed in depression E113 depressed in the radial direction in comparison with second inner peripheral section E112. This allows the inner peripheral surface of second inner peripheral section E112 to guide first seal member S1 upon inserting first seal member S1 into first communication passage E11, and suppresses the outer periphery of first seal member S1 from being damaged upon passing over second communication passage E12.

According to the present embodiment, first inner peripheral section E111 and second inner peripheral section E112 are smoothly connected to each other.

The smooth connection of first inner peripheral section E111 and second inner peripheral section E112 suppresses first seal member S1 from being damaged upon entering from second inner peripheral section E112 into first inner peripheral section E111.

According to the present embodiment, first communication passage E11 gradually increases in inner diameter, from first inner peripheral section E111 toward second inner peripheral section E112.

Such tapered shape gradually increasing the inner diameter of first communication passage E11 from first inner peripheral section E111 toward second inner peripheral section E112 serves as a draft taper upon die molding of first communication passage E11. This facilitates the die molding of first communication passage E11.

According to the present embodiment, the seal member (first seal member S1) includes: the seal body (first seal body SB1) establishing sealing between first communication passage E11 and valve 3; and the seal ring (first seal ring SR1) establishing sealing between the seal body (first seal body SB1) and first communication passage E11 in the radial direction.

Thus, first seal member S1 is composed of first seal body SB1 and first seal ring SR1 that are formed as separate parts. This improves flexibility in design of first seal member S1: for example, this enables implementation of appropriate change on material of first seal body SB1 and/or first seal ring SR1 for optimizing first seal body SB1 and first seal ring SR1 in frictional characteristics.

According to the present embodiment, the seal ring (first seal ring SR1) is the X-ring.

First seal ring SR1 is not limited to the X-ring, but may be another such as an O-ring. However, the O-ring is unfavorable for use in a sliding contact part because the O-ring is structured for use in a crushingly deformed state. On the other hand, the X-ring is less in contact area than the O-ring, and is favorable for use in a sliding contact part. In comparison with case of employing the O-ring as first seal ring SR1, the configuration of employing the X-ring as first seal ring SR1 reduces friction between first seal ring SR1 and the inner peripheral surface of first communication passage E11 (i.e. first inner peripheral section E111), and thereby allows reduction of the set load of first spring SP1. This further allows reduction of friction between first seal body SB1 and valve 3 and reduction of a driving torque of electric motor 4. This serves for downsizing and energy saving of control valve CV.

According to the present embodiment, depression E113 extends in the bias direction of the bias member (first spring SP1).

The configuration of forming the depression E113 to extend in the bias direction of first spring SP1 facilitates die molding of depression E113, and thereby improves productivity of control valve CV.

According to the present embodiment, depression E113 has the rectangular shape at the section in the bias direction of the bias member (first spring SP1).

The configuration of forming the depression E113 to have the rectangular shape at the section in the bias direction of the bias member (first spring SP1) facilitates die molding of depression E113, and thereby improves productivity of control valve CV.

According to the present embodiment, depression E113 is longer in the bias direction of the bias member (first spring SP1) than in the circumferential direction with respect to the bias direction of the bias member (first spring SP1).

The configuration of setting the length 1x of depression E113 in the bias direction longer than circumferential width W2 of depression E113 in the circumferential direction allows circumferential width W2 to be decreased, and thereby allows circumferential width W1 of second inner peripheral section E112 to be increased. This improves retainability of first spring SP1, and facilitates appropriate installation of first spring SP1.

According to the present embodiment, depression E113 is connected to first inner peripheral section E111 via slope E114 or a curved surface not shown, in the bias direction of the bias member (first spring SP1).

The configuration of smoothly connecting depression E113 to first inner peripheral section E111 via slope E114 etc. suppresses first seal member S1 from being damaged upon entering from second inner peripheral section E112 into first inner peripheral section E111.

According to the present embodiment, second inner peripheral section E112 spreads wider than depression E113, in the circumferential direction with respect to the bias direction of the bias member (first spring SP1).

The configuration of setting circumferential width W1 of second inner peripheral section E112 to be greater than circumferential width W2 of depression E113 improves retainability of first spring SP1, and facilitates appropriate installation of first spring SP1.

The control valve according to the present invention is not limited to the configurations shown in the above embodiment, but may be freely modified depending on specifications of target prime movers, as long as producing the effects of the present invention.

For example, although the above embodiment shows an example of the control valve employed in the circulation system of cooling water, the control valve can naturally handle not only cooling water but also various fluid such as lubrication oil.

Furthermore, although the above embodiment exemplifies first outlet port E1 as an example of employing the first and second communication passages according to the present invention, it may be applied not only in first outlet port E1 but also in other outlet ports. According to the present embodiment, besides first outlet port E1, second outlet port E2 includes first communication passage E21 and second communication passage E22 corresponding on the first and second communication passages according to the present invention, explanation for which is omitted because of redundancy with the explanation for first outlet port E1. In addition, FIG. 7 shows first communication passage E21 that includes a first inner peripheral section E211 and a second inner peripheral section E212 and a depression E213 corresponding to the first and second inner peripheral sections and the depression according to the present invention.

The following exemplifies conceivable aspects of a control valve according to the embodiment described above.

According to one aspect, the control valve includes: a housing including: a valve container formed in the housing; a first communication passage formed in the valve container so as to be open to outside of the housing; an opening formed in the housing so as to be open to the first communication passage; and a second communication passage being in communication with the first communication passage via the opening; a valve structured to be rotated by an actuator and change a state of communication between the valve container and the first communication passage depending on rotational position of the valve; a seal member disposed inside the first communication passage and structured to be in contact with the first communication passage so as to establish sealing between the first communication passage and the valve; a bias member disposed inside the first communication passage and structured to bias the seal member toward the valve; and a cap disposed inside the first communication passage and structured to shut off communication between the first communication passage and the outside of the housing while allowing communication between the first communication passage and the second communication passage, wherein the first communication passage includes: a first inner peripheral section structured to be in contact with an outer periphery of the seal member, in a radial direction with respect to a bias direction of the bias member; a second inner peripheral section disposed to overlap with the opening in position in the bias direction of the bias member, and structured to retain the bias member; and a depression disposed to overlap with the second inner peripheral section in position in the bias direction of the bias member, and depressed in the radial direction with respect to the bias direction of the bias member.

According to a favorable aspect of the control valve, the first inner peripheral section and the second inner peripheral section are smoothly connected to each other.

According to another favorable aspect of the control valve, in addition to any one of the above aspects, the first communication passage gradually increases in inner diameter, from the first inner peripheral section toward the second inner peripheral section.

According to still another favorable aspect of the control valve, in addition to any one of the above aspects, the seal member includes: a seal body establishing the sealing between the first communication passage and the valve; and a seal ring establishing sealing between the seal body and the first communication passage in the radial direction with respect to the bias direction of the bias member.

According to still another favorable aspect of the control valve, in addition to any one of the above aspects, the seal ring is an X-ring.

According to still another favorable aspect of the control valve, in addition to any one of the above aspects, the depression extends in the bias direction of the bias member.

According to still another favorable aspect of the control valve, in addition to any one of the above aspects, the depression has a rectangular shape at a section in the bias direction of the bias member.

According to still another favorable aspect of the control valve, in addition to any one of the above aspects, the depression is longer in the bias direction of the bias member than in a circumferential direction with respect to the bias direction of the bias member.

According to still another favorable aspect of the control valve, in addition to any one of the above aspects, the depression is connected to the first inner peripheral section via a slope or a curved surface, in the bias direction of the bias member.

According to still another favorable aspect of the control valve, in addition to any one of the above aspects, the second inner peripheral section spreads wider than the depression, in the circumferential direction with respect to the bias direction of the bias member.

The invention claimed is:

1. A control valve comprising:
a housing including: a valve container formed in the housing; a first communication passage formed in the valve container so as to be open to outside of the housing; an opening formed in the housing so as to be open to the first communication passage; and a second communication passage being in communication with the first communication passage via the opening;
a valve structured to be rotated by an actuator and change a state of communication between the valve container and the first communication passage depending on rotational position of the valve;
a seal member disposed inside the first communication passage and structured to be in contact with the first communication passage so as to establish sealing between the first communication passage and the valve;
a bias member disposed inside the first communication passage and structured to bias the seal member toward the valve; and
a cap disposed inside the first communication passage and structured to shut off communication between the first communication passage and the outside of the housing while allowing communication between the first communication passage and the second communication passage,
wherein the first communication passage includes:
a first inner peripheral section structured to be in contact with an outer periphery of the seal member, in a radial direction with respect to a bias direction of the bias member;
a second inner peripheral section disposed to overlap with the opening in position in the bias direction of the bias member, and structured to retain the bias member; and
a depression disposed to overlap with the second inner peripheral section in position in the bias direction of the bias member, and depressed in the radial direction with respect to the bias direction of the bias member.

2. The control valve as claimed in claim 1, wherein the first inner peripheral section and the second inner peripheral section are smoothly connected to each other.

3. The control valve as claimed in claim 2, wherein the first communication passage gradually increases in inner diameter, from the first inner peripheral section toward the second inner peripheral section.

4. The control valve as claimed in claim 1, wherein the seal member includes:
a seal body establishing the sealing between the first communication passage and the valve; and
a seal ring establishing sealing between the seal body and the first communication passage in the radial direction with respect to the bias direction of the bias member.

5. The control valve as claimed in claim 4, wherein the seal ring is an X-ring.

6. The control valve as claimed in claim 1, wherein the depression extends in the bias direction of the bias member.

7. The control valve as claimed in claim 6, wherein the depression has a rectangular shape at a section in the bias direction of the bias member.

8. The control valve as claimed in claim 7, wherein the depression is longer in the bias direction of the bias member than in a circumferential direction with respect to the bias direction of the bias member.

9. The control valve as claimed in claim 8, wherein the depression is connected to the first inner peripheral section via a slope or a curved surface, in the bias direction of the bias member.

10. The control valve as claimed in claim 1, wherein the second inner peripheral section spreads wider than the depression, in a circumferential direction with respect to the bias direction of the bias member.

* * * * *